United States Patent
Bhatia

(10) Patent No.: US 10,235,028 B2
(45) Date of Patent: Mar. 19, 2019

(54) TEXT EXTRACTION ON GRAPHS

(71) Applicant: International Business Machines Corporation, Armonk, NY (US)

(72) Inventor: Dimple Bhatia, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 15/178,598

(22) Filed: Jun. 10, 2016

(65) Prior Publication Data

US 2017/0357410 A1    Dec. 14, 2017

(51) Int. Cl.
*G06F 3/048* (2013.01)
*G06F 3/0484* (2013.01)
*G06F 17/27* (2006.01)
*G06F 3/0482* (2013.01)
*G06F 17/28* (2006.01)

(52) U.S. Cl.
CPC ........ *G06F 3/04842* (2013.01); *G06F 3/0482* (2013.01); *G06F 17/275* (2013.01); *G06F 17/276* (2013.01); *G06F 17/2735* (2013.01); *G06F 17/289* (2013.01)

(58) Field of Classification Search
CPC .......................... G06F 3/0482; G06F 3/04886
See application file for complete search history.

(56) References Cited

U.S. PATENT DOCUMENTS

| 7,730,085 | B2 | 6/2010 | Hassan | |
|---|---|---|---|---|
| 9,235,806 | B2 | 1/2016 | Sweeney | |
| 2006/0069603 | A1* | 3/2006 | Williams | G06F 3/04817 715/834 |
| 2007/0124291 | A1* | 5/2007 | Hassan | G06F 17/30716 |
| 2008/0229245 | A1* | 9/2008 | Ulerich | G06F 3/0482 715/834 |
| 2011/0055192 | A1* | 3/2011 | Tang | G06F 17/30684 707/706 |
| 2011/0055760 | A1* | 3/2011 | Drayton | G06F 3/0482 715/834 |
| 2014/0237359 | A1 | 8/2014 | Privault et al. | |

OTHER PUBLICATIONS http://conversionxl.com/10-useful-findings-about-how-people-view-websites/, author unknown, publication date unknown, printed on May 2, 2016.

* cited by examiner

*Primary Examiner* — William L Bashore
*Assistant Examiner* — Rayeez R Chowdhury
(74) *Attorney, Agent, or Firm* — Robert C. Bunker

(57) ABSTRACT

Techniques are described for text extraction on graphs. In one example, techniques include receiving a graphical representation of data, the graphical representation of data being a format other than a spreadsheet or table; and receiving user input selecting a portion of the graphical representation of data; and generating one or more text analytics rules based on the selected portion. The graphical representation may be a pie chart or a radial sunburst diagram.

3 Claims, 3 Drawing Sheets

TEXT EXTRACTION ON GRAPHS

TECHNICAL FIELD

The invention relates to data management and text analytics systems.

BACKGROUND

A typical process of information extraction involves loading the data and then applying rules of extraction by using dictionaries, regular expressions and proximity of words between them directly against the data. However, from a data analyst's perspective, this process may prove cumbersome for some types of data, for example data represented in a graph or graphical representation of data. Thus, some types of data may be excluded from text analytics since the format is not compatible with existing text analytics processes.

SUMMARY

In general, examples disclosed herein are directed to techniques for text extraction on graphs. In one example, techniques include receiving a graphical representation of data, the graphical representation of data being a format other than a spreadsheet or table, receiving user input selecting a portion of the graphical representation of data, and generating one or more text analytics rules based on the selected portion.

In other example, a computer system for includes one or more processors, one or more computer-readable memories, and one or more computer-readable, tangible storage devices. Program instructions are stored on at least one of the one or more storage devices for execution by at least one of the one or more processors via at least one of the one or more memories, to perform operations including receiving a graphical representation of data, the graphical representation of data being a format other than a spreadsheet or table, receiving user input selecting a portion of the graphical representation of data, and generating one or more text analytics rules based on the selected portion.

In another example, a computer program product includes a computer-readable storage medium has program code embodied therewith. The program code is executable by a computing device to perform operations including receiving a graphical representation of data, the graphical representation of data being a format other than a spreadsheet or table, receiving user input selecting a portion of the graphical representation of data, and generating one or more text analytics rules based on the selected portion.

DETAILED DESCRIPTION

Figure 1:
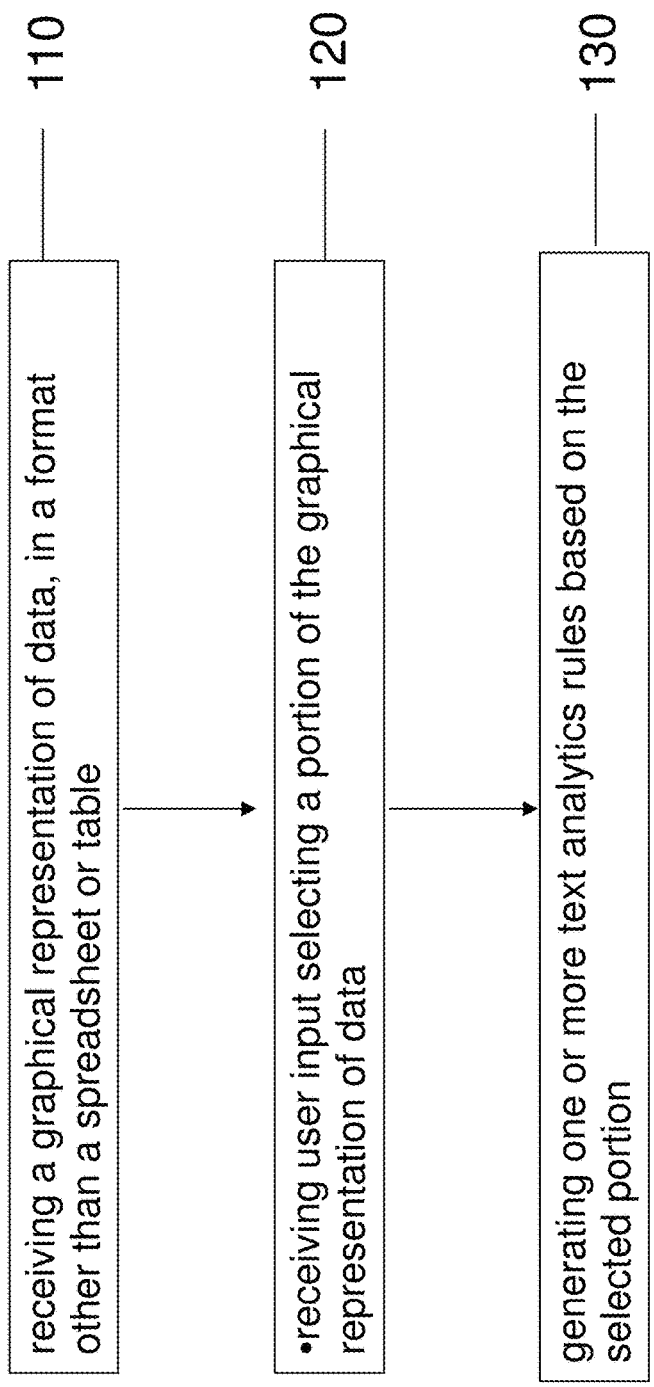
FIG. 1 is a flow diagram illustrating a method for text extraction on graphs.
Figure 2:
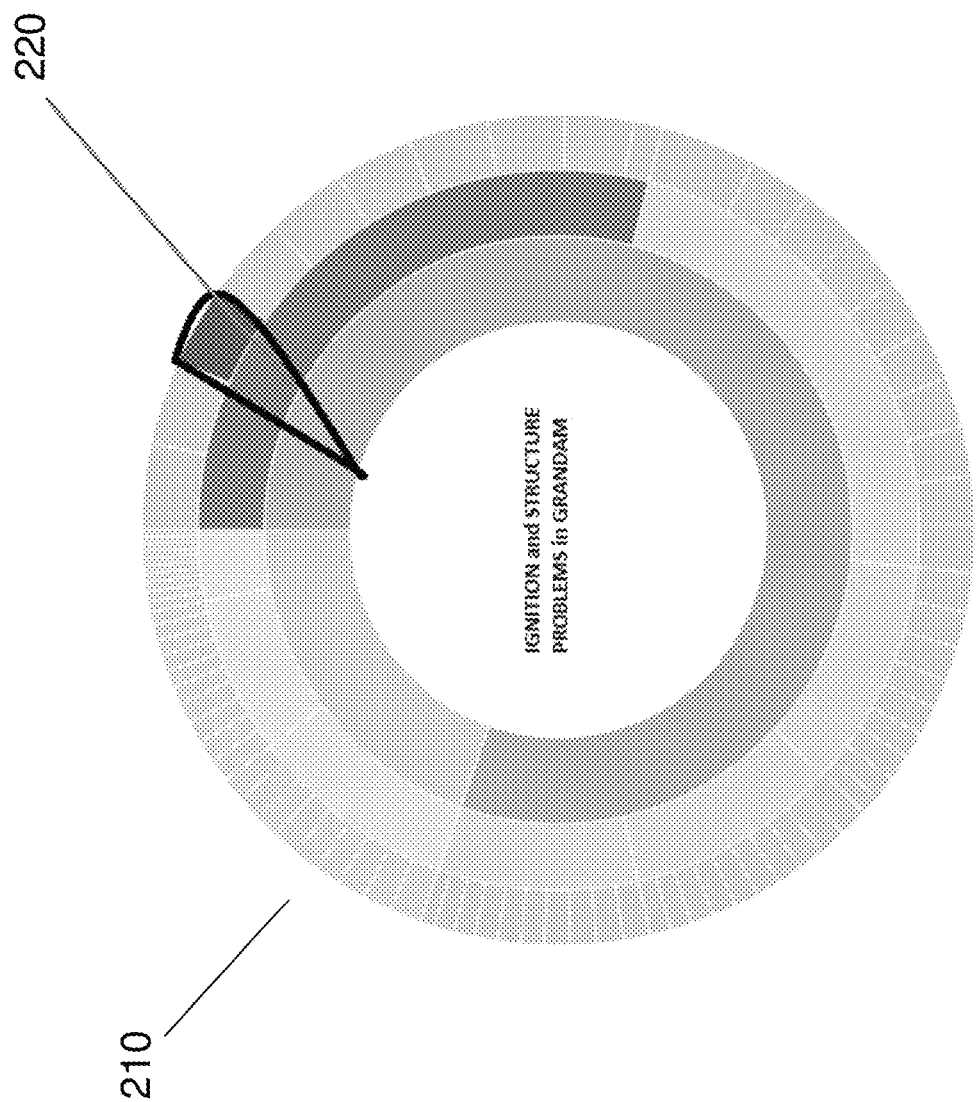
FIG. 2 is an illustration of text extraction on a radial sunburst chart.

Various examples are disclosed herein for text extraction on graphs. In one embodiment, as shown in FIG. 1, a method for text extraction on graphs includes receiving a graphical representation of data (110), receiving user input selecting a portion of the graphical representation of data (120), and generating one or more text analytics rules based on the selected portion (130.) The graphical representation of data is a format other than a spreadsheet or table. It can be, for example, a pie graph, or a radial sunburst chart 210, as illustrated in FIG. 2.

In one aspect, a system for text extraction on graphs includes the following components:

(1) Input data to be analyzed, the input data being in the form of a graph.

(2) A graphical user interface that allows portions of the graph to be selected. For example, as illustrated in FIG. 2, multiple rings 220 of a radial sunburst chart 210 are selected. Alternatively, different portions of the same ring can also be selected.

(3) Text analysis rules and configuration information, such as dictionaries, which are applied to the different portions of the graph. The system takes the input from the user selections made on the graph and uses this input to generate text analysis rules and dictionary configurations, including mappings between portions of the graph and certain categories of data, such as revenue, brand of car etc. The text analysis and dictionary configurations may be implemented via known techniques.

(4) Output of executing text analysis rules with configuration information on the input data. The output may be a report, for example, a report of revenue listings for different brands of cars, where the source data is provided in graphical form (e.g., sunburst diagram) and the system generates one dictionary for revenue and another dictionary for brands of cars.

The visualization can lead to the modification of the rules and configuration to provide new output. In the absence of a new rule, a default rule may count the frequency of words to provide the initial display. A dictionary can be created/modified by visually selecting words or sets of words in a graph. A number of visual representations can be chosen from and different graphical representations and selections can be defined upon them as a series of rules and rule modifications. These rules may include the specification of AND or OR (or XOR) via selecting more than one graphical region, NOT by selecting the inverse of a region.

For example, in a sunburst diagram, selecting two ring segments in the same ring represents an OR condition, such as Honda OR GM. In a sunburst diagram, each ring could represent a different subrule, where the entire diagram represents a compound rule for AND of the two subrules together. For example, (Honda OR GM) AND (Brakes OR Airbag). Other examples include Proximity, Dictionary, and Noun/Verb as example subrules that could be leveraged inside such a rule building system.

Figure 3:
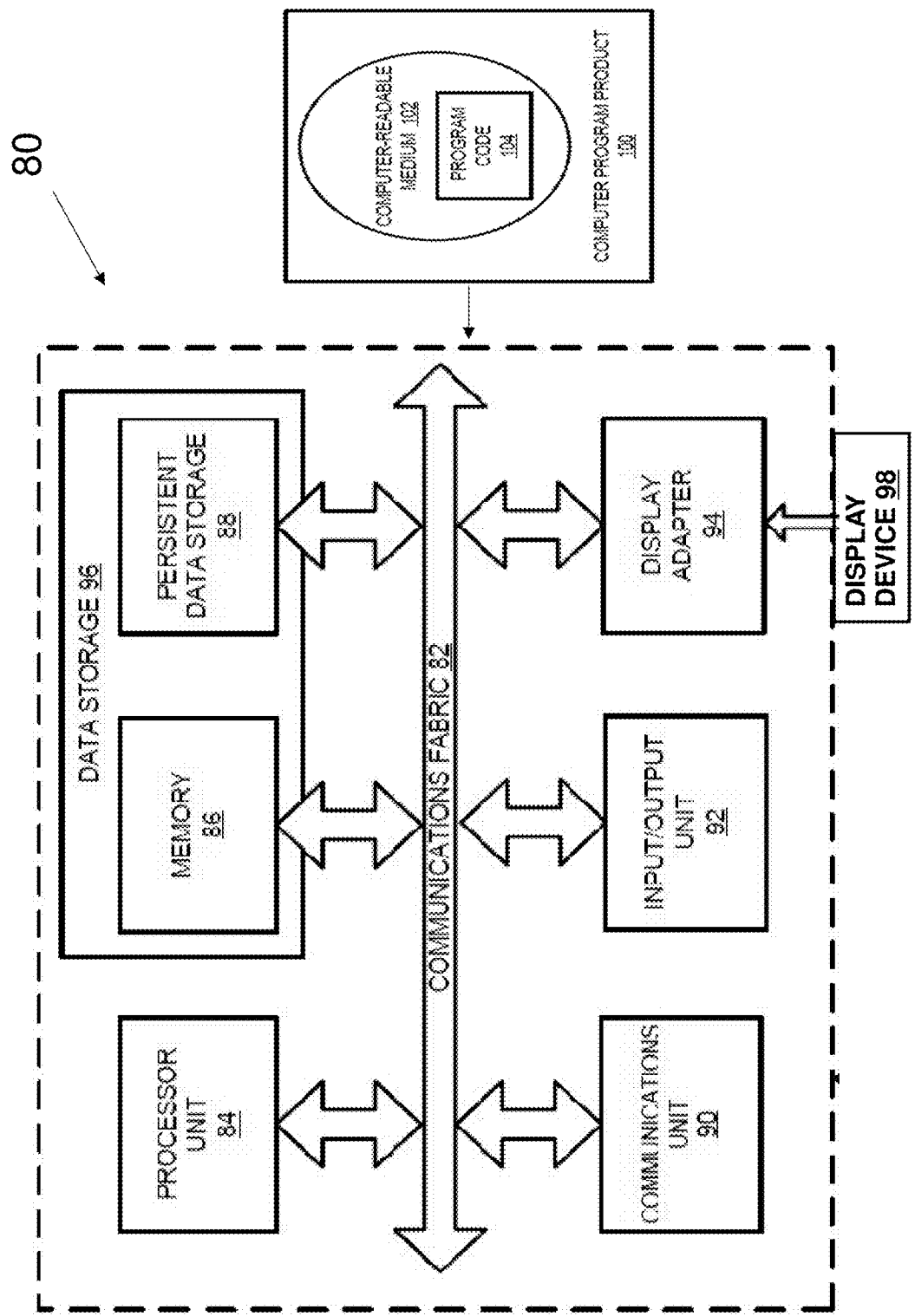
FIG. 3 is a block diagram of a computing device for text extraction on graphs.

In the illustrative example of FIG. 3, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Some examples may use such a non-transitory medium. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a semantic model constructor 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples.

Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of IBM CONFIDENTIAL D-2 the invention.

It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for text extraction on graphs, the method comprising:

receiving a graphical representation of a plurality of input data, the graphical representation of the plurality of input data being a radial chart comprising a first ring and a second ring;

presenting a graphical user interface that allows one or more portions of the radial chart to be selected;

receiving user input selecting a portion of the graphical representation of the plurality of input data;

generating one or more text analytics rules based on the selected portion, wherein the generated one or more text analytics rules comprises:

in response to the received user input selecting a first portion of the first ring and a second portion of the first ring, generating an OR text analytics rule; and in response to the received user input selecting a first ring portion of the first ring and a second ring portion of the second ring, generating an AND text analytics rule;

generating a dictionary that defines correspondences between the selected portions of the graphical representation and categories of data;

generating a report based on executing the generated one or more text analytics rules and the generated dictionary on the plurality of input data; and outputting the generated report.

2. A computer system comprising:

one or more processors, one or more computer-readable memories, and one or more computer-readable, tangible storage devices;

program instructions, stored on at least one of the one or more storage devices for execution by at least one of the one or more processors via at least one of the one or more memories to perform operations comprising:

receiving a graphical representation of a plurality of input data, the graphical representation of the plurality of input data being a radial chart comprising a first ring and a second ring;

presenting a graphical user interface that allows one or more portions of the radial chart to be selected;

receiving user input selecting a portion of the graphical representation of the plurality of input data;

generating one or more text analytics rules based on the selected portion, wherein the generated one or more text analytics rules comprises:

in response to the received user input selecting a first portion of the first ring and a second portion of the first ring, generating an OR text analytics rule; and in response to the received user input selecting a first ring portion of the first ring and a second ring portion of the second ring, generating an AND text analytics rule;

generating a dictionary that defines correspondences between the selected portions of the graphical representation and categories of data;

generating a report based on executing the generated one or more text analytics rules and the generated dictionary on the plurality of input data; and outputting the generated report.

3. A computer program product comprising a non-transitory computer-readable storage medium having program code embodied therewith, the program code executable by a computing device to perform operations comprising:

receiving a graphical representation of a plurality of input data, the graphical representation of the plurality of input data being a radial chart comprising a first ring and a second ring;

presenting a graphical user interface that allows one or more portions of the radial chart to be selected;

receiving user input selecting a portion of the graphical representation of the plurality of input data;

generating one or more text analytics rules based on the selected portion, wherein the generated one or more text analytics rules comprises: in response to the received user input selecting a first portion of the first ring and a second portion of the first ring, generating an OR text analytics rule; and in response to the received user input selecting a first ring portion of the first ring and a second ring portion of the second ring, generating an AND text analytics rule; generating a dictionary that defines correspondences between the selected portions of the graphical representation and categories of data; generating a report based on executing the generated one or more text analytics rules and the generated dictionary on the plurality of input data; and outputting the generated report.

* * * * *